US009873347B2

(12) United States Patent
Brown

(10) Patent No.: US 9,873,347 B2
(45) Date of Patent: Jan. 23, 2018

(54) METHOD AND APPARATUS FOR AUTOMATIC CHARGING OF AN ELECTRICALLY POWERED VEHICLE

(76) Inventor: Wendell Brown, Henderson, NV (US)

(*) Notice: Subject to any disclaimer, the term of this patent is extended or adjusted under 35 U.S.C. 154(b) by 599 days.

(21) Appl. No.: 12/427,892

(22) Filed: Apr. 22, 2009

(65) Prior Publication Data
US 2010/0235006 A1    Sep. 16, 2010

Related U.S. Application Data

(60) Provisional application No. 61/159,656, filed on Mar. 12, 2009.

(51) Int. Cl.
H02J 7/00     (2006.01)
B60L 11/18    (2006.01)

(52) U.S. Cl.
CPC ......... B60L 11/1833 (2013.01); B60L 11/182 (2013.01); B60L 11/1827 (2013.01); B60L 11/1829 (2013.01); B60L 2200/26 (2013.01); Y02T 10/7005 (2013.01); Y02T 10/7072 (2013.01); Y02T 90/121 (2013.01); Y02T 90/122 (2013.01); Y02T 90/125 (2013.01); Y02T 90/14 (2013.01)

(58) Field of Classification Search
CPC ............ B60L 11/1833; B60L 11/1829; B60L 11/182; B69L 11/1848
USPC ........... 320/104, 108, 109; 307/149, 150; 340/933, 935, 988, 991, 426.16; 701/24, 701/32, 201, 213; 180/14.3, 205.1, 65.1, 180/65.21, 65.26, 65.265, 65.27, 65.275, 180/65.28, 65.285
See application file for complete search history.

(56) References Cited

U.S. PATENT DOCUMENTS

| 5,461,298 A | * | 10/1995 | Lara et al. | 320/109 |
| 5,594,318 A | * | 1/1997 | Nor et al. | 320/108 |
| 5,617,003 A | * | 4/1997 | Odachi et al. | 320/108 |
| 5,669,470 A | * | 9/1997 | Ross | 191/10 |
| 5,821,728 A | * | 10/1998 | Schwind | 320/108 |
| 5,821,731 A | * | 10/1998 | Kuki et al. | 320/108 |
| 5,926,004 A | * | 7/1999 | Henze | 320/109 |
| 6,157,162 A | * | 12/2000 | Hayashi et al. | 320/104 |
| 6,525,510 B1 | * | 2/2003 | Ayano et al. | 320/109 |
| 6,792,259 B1 | * | 9/2004 | Parise | 455/343.1 |
| 7,602,143 B2 | * | 10/2009 | Capizzo | 320/109 |

(Continued)

Primary Examiner — Drew A Dunn
Assistant Examiner — Zixuan Zhou
(74) Attorney, Agent, or Firm — Alston & Bird LLP

(57) ABSTRACT

A method and apparatus for automatically charging an electrically powered vehicle are provided. The apparatus comprises a sensor for sensing proximity or presence of the vehicle, and one or more chargers for automatically coupling with corresponding receptacles of the vehicle and charging an onboard electrical storage device (e.g., a battery). The vehicle may be driven to or parked in a position that automatically couples the apparatus and vehicle as needed, or the apparatus may include locomotion means (e.g., wheels, tracks, rails) for moving along one or more axes of movement. The degree of coupling may depend on the type of charger to be engaged—such as direct contact for conductive and inductive chargers, or close proximity for a near-field charger. The apparatus may also include manual controls for moving/operating the apparatus, a processor for controlling operation of any element(s) of the apparatus, and/or other components.

20 Claims, 8 Drawing Sheets

(56) References Cited

U.S. PATENT DOCUMENTS

| | | |
|---|---|---|
| 2003/0151387 A1* | 8/2003 | Kumar .......................... 320/104 |
| 2004/0130292 A1* | 7/2004 | Buchanan et al. ............ 320/116 |
| 2009/0079388 A1* | 3/2009 | Reddy .......................... 320/109 |
| 2011/0140658 A1* | 6/2011 | Outwater et al. ............. 320/109 |
| 2011/0221393 A1* | 9/2011 | Billmaier ..................... 320/109 |

* cited by examiner

METHOD AND APPARATUS FOR AUTOMATIC CHARGING OF AN ELECTRICALLY POWERED VEHICLE

RELATED APPLICATION

This application claims priority to U.S. Provisional Application No. 61/159,656, filed Mar. 12, 2009, which is hereby incorporated by reference.

BACKGROUND

This invention relates to the field of electronics. More particularly, a system and methods are provided for automatically charging or recharging an electric vehicle.

Electric vehicles (EVs) include vehicles that are purely electrically powered, as well as true hybrids and plug-in hybrids that may be powered at different times by electrically driven motors and by traditional internal combustion engines. EVs are increasingly popular for a variety of reasons, including environmental considerations, prices that continue to decrease as the vehicles become more popular, ranges that are ever increasing, and so on.

However, even as EVs become more and more prevalent, one problem remains—that of charging the vehicles. Because some or all of the electrical power consumed by the vehicles must be stored on-board, the batteries or fuel cells that provide the electricity must be periodically recharged. This is true even for vehicles that are capable of generating limited amounts of electrical power during operation—such as when a hybrid's internal combustion engine is running and/or when energy generated by the application of a vehicle's brakes is captured.

Currently, an operator of an electric vehicle must park in proximity to a charging station and manually couple some form of charging cable to the vehicle. The configuration of the charging equipment varies from manufacturer to manufacturer, and depends on whether the charger operates conductively or inductively, but in all cases manual coupling is required.

Unfortunately, a vehicle may need to be recharged after or before virtually every use. Thus, an operator must manually couple and decouple the charging cable every time she wishes to use the vehicle. If she forgets to couple the charging cable, or couples it in a manner that prevents optimal charging, she may be unable to use the vehicle or it may have insufficient charge to accommodate the full length of a desired trip.

Although the novelty of having to "plug-in" one's vehicle may currently be sufficient to spark a reminder and motivate one to recharge a vehicle, over time the level of inconvenience one endures in having to continually perform this activity may make it onerous.

Manual recharging also raises safety concerns. For example, when it is raining, a vehicle operator may be apprehensive about manually connecting a charger, especially a conductive one that has exposed electrical conductors. She may also prefer to avoid getting wet, and/or may wish to avoid handling a dirty charging cable/adapter and soiling her hands or clothes.

Another problem arises if the operator parks too far from the charging station, or in an awkward position. In such circumstances, the charging cable may not reach the vehicle or its charging port. In this case the operator must reposition the vehicle; this may become frustrating during inclement weather or if it occurs frequently. Yet further, depending on the location and configuration of the charging station, and the operator's physical condition (e.g., if he or she is handicapped), manually coupling the charging cable to the vehicle may be difficult or even impossible.

SUMMARY

In some embodiments of the invention, a method and apparatus are provided for automatically charging an electrically powered vehicle. In these embodiments, the apparatus comprises triggering means for sensing proximity or presence of the vehicle, coupling means for automatically coupling a charger to a corresponding receptacle of the vehicle and charging means for charging an onboard electrical storage device (e.g., a battery).

Illustratively, the triggering means may comprise a sensor and associated circuitry (e.g., a processor for controlling the sensor or interpreting its signals), the coupling means may comprise an apparatus that can move in one, two or three axes, and the charging means may comprise any number of chargers that employ inductive, conductive, near-field or other means of transferring electrical power. Some or all components of the invention may be collocated in one apparatus.

The vehicle may be driven to or parked in a position that automatically couples the apparatus and vehicle as needed. Or, the apparatus may include locomotive means (e.g., wheels, tracks, rails) for rotating and/or moving along one or more axes of movement to facilitate coupling with the vehicle, in which case the vehicle need not be parked in one specific location and orientation.

The degree of coupling may depend on the type of charger to be engaged. Direct contact may be required for conductive and some inductive chargers, while some degree of proximity may suffice for other inductive chargers and for near-field charging devices.

The apparatus may also include manual controls for moving/operating the apparatus, a processor for controlling operation of any element(s) of the apparatus, and/or other components. The apparatus may also include or be communicatively coupled with a guide device that helps an operator of the vehicle place the vehicle in a position at which it can be automatically charged.

DETAILED DESCRIPTION

Figure 1:
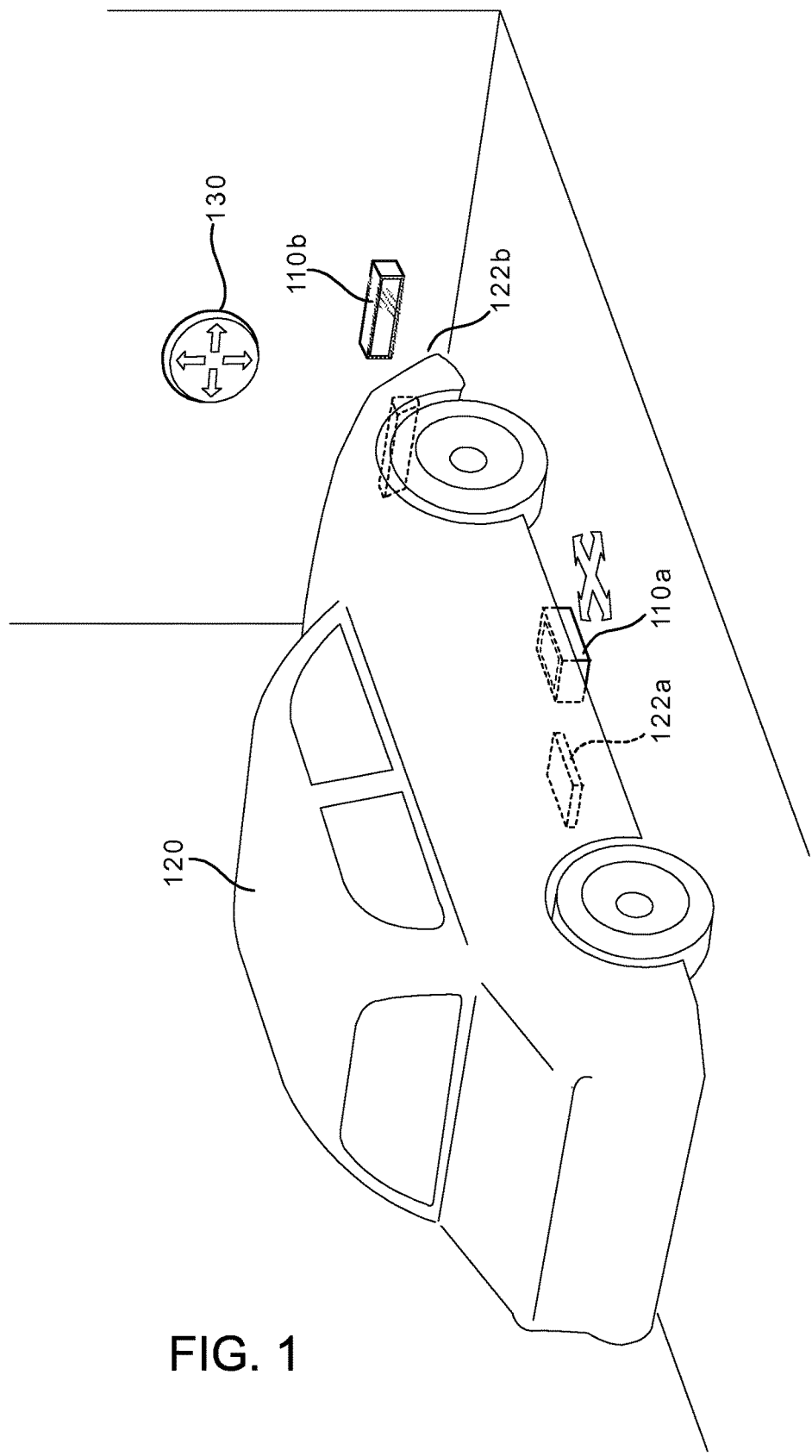
FIG. 1 is a block diagram depicting an environment in which an automatic vehicle charging apparatus may be employed, according to some embodiments of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In embodiments of the invention, methods and apparatus are provided for automatically recharging an electric vehicle (EV) or electrically powered vehicle. The apparatus may be used with true hybrid and plug-in hybrid vehicles, as well as with vehicles completely powered by electricity. Embodiments of the invention may be employed with vehicles of any size and configuration (e.g., vehicles having two or more wheels).

In some embodiments of the invention, an apparatus for automatically charging or recharging an EV includes means for triggering the apparatus to initiate the charging process, means for positioning the apparatus and means for automatically coupling the apparatus and the vehicle. Means for moving the apparatus may be unnecessary in other embodiments. Further, one or more embodiments of the invention may also include means for automatically decoupling the apparatus from the vehicle, and/or means for determining that the apparatus should be decoupled.

In some embodiments of the invention, the apparatus may feature an inductive charger, while other embodiments may include a conductive charger, an RF (radio frequency) charger or some other type of power-transfer technology (e.g., near-field). Some embodiments may include multiple chargers (e.g., one or more inductive chargers and one or more conductive chargers).

Embodiments of the invention may be installed and operated within a vehicle owner's (or operator's) residence (e.g., in a garage or driveway), in a public space (e.g., a public street, a public parking garage), at a commercial location (e.g., a parking lot for a restaurant), and/or other locations. Thus, an electric vehicle's battery or batteries may be periodically or regularly topped off with short charging sessions performed while a vehicle operator commutes, runs errands, waits for a passenger, and so on, thereby extending the vehicle's operating range.

The length of time for which an automated charging apparatus may be engaged with a vehicle has no minimum or maximum. The vehicle may therefore be charged while stopped at a red light, parked at a commercial location (e.g., a restaurant, a store), etc.

In some embodiments of the invention, the apparatus may be installed on the ground or in another configuration that allows an EV to be parked or positioned above it. When triggered, the apparatus rises, if and as necessary, to allow a charger to couple with a charging receptacle of the EV and begin charging. Or, correct positioning of the vehicle may inherently cause the apparatus to mate with the vehicle.

In other embodiments, the apparatus may couple with a vehicle from a different location or direction, such as from in front of, behind, beside or above the vehicle. In these embodiments, when triggered, the apparatus may or may not move to effect or enable the coupling.

After the vehicle is fully charged, or when the vehicle is to be operated, the automatic charger may disengage automatically and return to its starting position. In some or all embodiments, an automatic charger may be coupled and/or decoupled manually if necessary.

Operation of the automatic charging apparatus to automatically couple with a vehicle may be triggered in different ways in different embodiments of the invention. Illustratively, a weight sensor or an inductive sensor may detect the presence of the vehicle. Or, an optical or RF-based sensor may detect the vehicle. A sensor that triggers operation of the apparatus may be built into the apparatus or may operate externally (e.g., as part of the vehicle) and communicate with the apparatus.

Yet further, some particular action may trigger the automatic charging apparatus, such as opening a garage door when the vehicle is not already inside, putting the vehicle into park, turning off the vehicle, removing a key from the starter/ignition, opening a vehicle door while the vehicle is occupied, vacating the driver's seat, etc. In an exemplary implementation, charging may only commence when the vehicle is in park, the driver's seat is vacant and all doors are locked.

In embodiments in which a vehicle communicates with an automated charging apparatus when it is triggered (or in order to trigger it), a location of the vehicle may be communicated to the apparatus and be understood to indicate that the vehicle is now proximate to or is approaching the apparatus. The location may comprise GPS coordinates. In these embodiments the apparatus determines when the vehicle is in position or will be in position for charging.

In some other embodiments, the vehicle may determine that it is in position for charging and signal the apparatus accordingly. For example, the vehicle may emit a particular RF or audible (e.g., ultrasonic) transmission. The same (or a different) transmission may be issued to instruct the apparatus to cease charging.

When the charger is triggered, it may pause for some period of time (e.g., 5 minutes, 10 minutes) before initiating the automatic coupling. This may avoid engaging the apparatus when a vehicle operator moves the vehicle again within a short period of time. In other implementations, the charger may couple with the vehicle immediately (or soon) after being triggered.

Triggers for disengaging a charger may also vary from one embodiment of the invention to another. Illustratively, counterparts of actions that trigger initiation of charging may trigger the cessation of charging—such as opening a vehicle door when it is empty, putting a key into the vehicle's ignition/starter, engaging a seat belt, starting the vehicle, opening a garage door when the vehicle is parked inside, putting it into drive, etc. In some implementations, a charging apparatus may automatically disengage after the vehicle is fully charged or charged to some threshold (e.g., 90%, 98%).

In some embodiments of the invention, an automatic charging apparatus may communicate with a vehicle to obtain or transfer information. For example, the apparatus may determine who owns (or operates) the vehicle, its license plate number, the make and model of vehicle, billing information (e.g., for billing for the electrical charging), insurance data, and so on. The apparatus may also learn the configuration or operating parameters of the vehicle's electrical system, so that the apparatus can engage a suitable charger (e.g., conductive vs. inductive, 110V vs. 220V).

Information may be exchanged between the automatic charging apparatus and a vehicle via a wireless or wired link. A wired communication link may form part of a conductive or inductive charger portion of the apparatus. A wireless link may be hosted by a component (e.g., an RF transceiver) that also allows the charger to detect the vehicle and/or guide the coupling of the charger to the vehicle. In some embodiments, a vehicle may be identified by a barcode, serial number, RFID tag or other label that can be read or sensed by an automatic charging apparatus.

To help the operator of a vehicle position the vehicle so that an automatic charging apparatus can be engaged, a visual, audio or some other type of guide may be installed in the vehicle or in the vicinity of the apparatus (e.g., on a wall or a post).

Such a guide or visual indicator may display the vehicle's position relative to the charging apparatus, or vice versa. In some embodiments, different colors may indicate different positions. For example, a red display may indicate that the vehicle is out of range. Yellow may signify that the vehicle is in range of an automatic charging apparatus that is capable of moving itself to automatically couple with the vehicle. Green may signify that the vehicle is right over the apparatus (or has docked with an apparatus that requires the vehicle to be moved/driven into a docking position).

In some embodiments of an operator guide, arrows, dots, letters, words and/or other markings may be displayed to indicate to the operator that he should move the vehicle in some direction (i.e., forward, backward, to the left, to the right). An audible tone, a particular visual display or other signal may be used to alert the vehicle operator that the vehicle is in a position at which the automatic charging apparatus can be (or has been) engaged.

In some embodiments, a guide may be as simple as a set of marks painted or otherwise affixed to the ground, walls or other surfaces to provide visual clues as to where the apparatus is when the vehicle operator cannot see the apparatus directly (e.g., when the vehicle is over the apparatus). For example, hash marks or arrows leading to/from a charging apparatus may be painted on the ground, and extend far enough away from the apparatus that the operator can see them when the vehicle is situated above the apparatus.

In embodiments of the invention in which an automatic charging apparatus can rotate and/or move in one or both horizontal axes (i.e., forward/backward, left/right), a vehicle operator may be granted wide latitude in positioning the vehicle. In other words, he may not need to park in a position such that the vehicle's receptacle is directly above the apparatus.

An automatic vehicle charging apparatus may be configured to mate with a primary or alternative vehicle receptacle, or with multiple different types of vehicle receptacles. Thus, just as the apparatus may comprise different charger types/configurations, a vehicle may have multiple charger receptacles, possibly including one or more that are compatible with traditional manual charging means.

FIG. 1 is a block diagram illustrating an automatic charging apparatus for an electrically powered vehicle, according to some embodiments of the invention. In these embodiments, the apparatus is configured so that an operator of the EV may park or stop the vehicle over the apparatus, after which it automatically couples with and charges the vehicle.

In the illustrated embodiment of the invention, automatic charging apparatus 110a is installed on the floor or ground, and is designed to couple with a compatible charging receptacle 122a situated on the underside of a vehicle 120. In other embodiments, the apparatus may be installed on a wall, a post, a ceiling or other surface, and couple with a receptacle installed on some other portion of a vehicle (e.g., a bumper, a door frame). Apparatus 110b and receptacle 122b demonstrate illustrative alternative placements of each component—on a wall (or other vertical surface) and a bumper of the vehicle, respectively.

When triggered, charging apparatus 110a moves in one, two or all three axes, and may rotate as necessary, to align itself and mate with corresponding receptacle 122a. Power transfer can then begin. After the vehicle is fully charged, or when a decoupling process is automatically or manually initiated, charging apparatus 110a retracts to its starting position shown in FIG. 1.

Optional visual guide 130 is designed to assist an operator of vehicle 120 in positioning the vehicle in an orientation that permits coupling of apparatus 110a and receptacle 122a. Illustratively, until the vehicle is located in a position at which the coupling can be performed, guide 130 displays one or more arrows (e.g., forward (or up), backward (or down), left, right) that inform the operator of the direction(s) in which the vehicle should be moved. Curved arrows may also be displayed if the vehicle is positioned at an incompatible angle to the apparatus, to indicate how the vehicle should be turned.

In other embodiments, guide 130 may display information differently (e.g., with colors, symbols, text, numbers) to guide the vehicle operator. In yet other embodiments, an operator guide may be installed in vehicle 120 (e.g., on a dashboard) instead of, or in addition to, an external guide such as guide 130.

Guide 130 may be activated automatically when a sensor detects the vehicle or a relatively large mass. The sensor may be embedded in guide 130, apparatus 110a or may be separate from the guide and apparatus. Thus, apparatus 110a and guide 130 may be triggered independently or in conjunction with each other.

Figure 2:
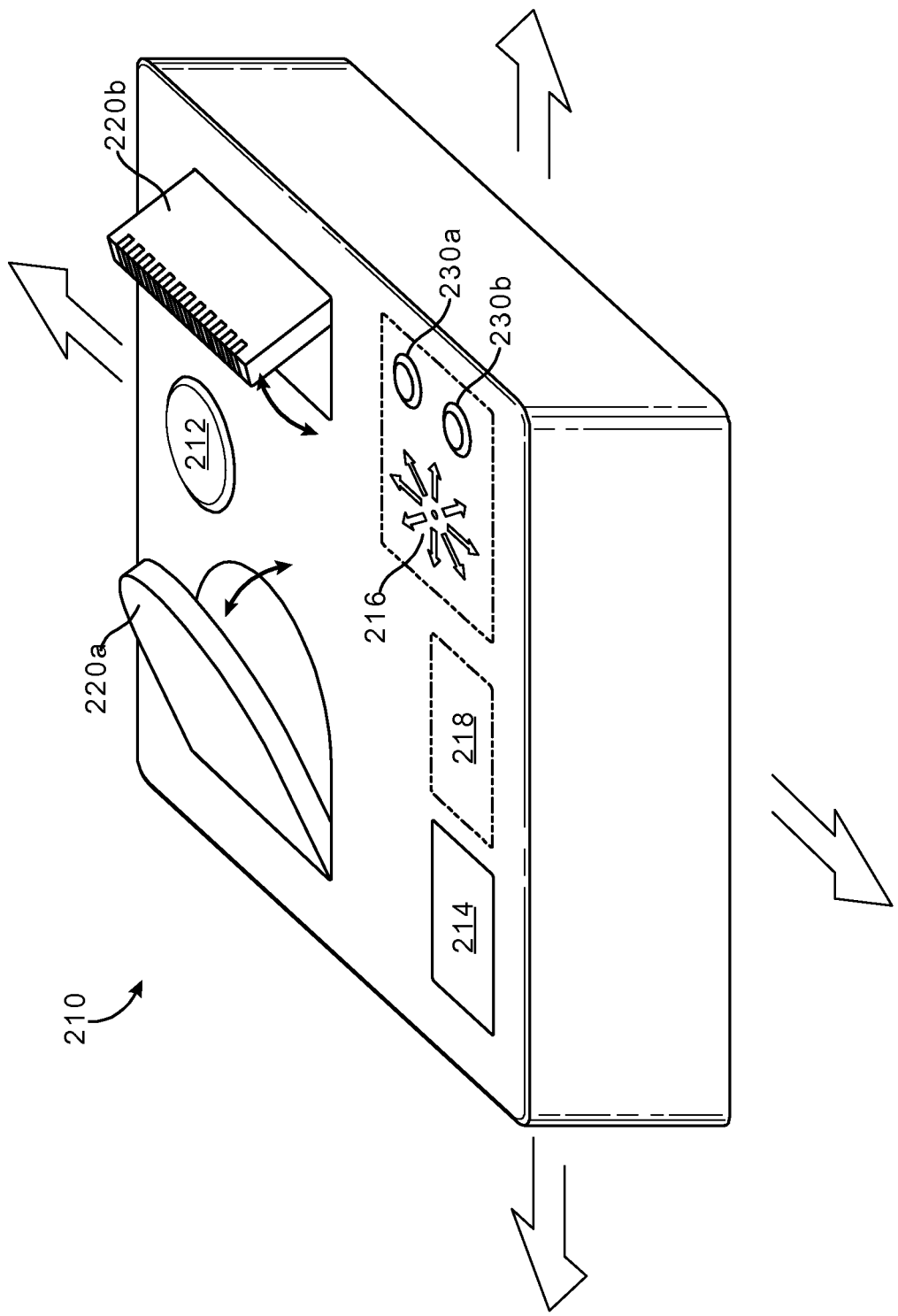
FIG. 2 is a block diagram of an automatic vehicle charging apparatus in accordance with some embodiments of the invention.

FIG. 2 is a diagram of an automatic charging apparatus according to some embodiments of the invention. In these embodiments, the apparatus may be installed on virtually any surface, whether horizontal, vertical or slanted.

Automatic charging apparatus 210 of FIG. 2 comprises sensor 212 and one or more chargers 220. In the illustrated embodiments of the invention, the chargers include inductive charger 220a and conductive charger 220b. Other types of chargers (e.g., RF, near-field) now known or hereafter developed may also be implemented.

Although inductive charger 220a is depicted in a traditional paddle shape, and conductive charger 220b is depicted as having a blade shape, in other embodiments of the invention the chargers may be configured differently (e.g., as plugs, brushes, plates, coils). Thus, to accommodate different makes/models of vehicles, and different vehicle receptacle configurations, an automatic charging apparatus provided herein may comprise chargers of various shapes, sizes and capacities.

Also, chargers 220a, 220b of FIG. 2 are depicted as hinged devices that can unfold to a deployed position oriented at approximately 90 degree angles to the face of apparatus 210, and fold to or into the surface of the apparatus when not deployed. In other embodiments of the invention, a charger may remain in its deployed position even when not in use, may be extended in some other manner, or may be permanently fixed in an operative position.

A charger 220 may be designed to "break-away" in the event a vehicle that is being charged is moved or driven away before the charger is retracted, in order to limit the damage to apparatus 210. In embodiments of the invention in which apparatus 210 is affixed to a vertical surface (e.g., a wall, a post), a vehicle may be driven away from the apparatus without damage to a charger because movement of the vehicle will by necessity detach the vehicle substantially parallel to the direction of motion when a charger mates with the vehicle's receptacle.

In an automated charging apparatus that comprises multiple chargers, the apparatus may be configured to always use a particular charger appropriate for the primary or sole type of vehicle it will recharge (until or unless it is reconfigured), or it may sense which charger is appropriate for the vehicle (e.g., via wireless communication with the vehicle) and activate it accordingly.

A charging receptacle of a compatible EV may be shaped to promote coupling with a charger 220, such as by having a funnel- or Y-shaped entrance that guides a charger to its target. In some embodiments of the invention, male chargers are installed on a vehicle, and corresponding female receptacles are included in an automatic charging apparatus, although this arrangement may be reversed in other embodiments.

In embodiments of the invention in which an automated charging apparatus charges an electric vehicle inductively, the vehicle's inductive receiver or transceiver may be installed or placed in any convenient location of the vehicle. For example, it may be installed under the outer skin (e.g., plastic, polyurethane) of the vehicle, under the hood, inside or under a bumper, in the roof or other panel, etc. To engage the vehicle's inductive receiver, an inductive charger merely needs to be placed in proximity to the receiver.

Sensor 212 is capable of detecting a position of a vehicle receptacle (e.g., receptacle 122a of FIG. 1) relative to apparatus 210. As described above, the sensor may also be used to trigger other components or action (e.g., guide 130 of FIG. 1, operation of a garage door, summoning of an attendant to assist with charging and/or other activity, communication with the vehicle).

Sensor 212 may use optics (e.g., with a laser or other low-power light signal), radio frequency (e.g., to detect an RFID chip associated with the receptacle), magnetism or other search means now known or hereafter developed to locate a vehicle or vehicle receptacle. In some embodiments, sensor 212 comprises a suitable type of image sensor such as, but not limited to, a CCD (Charge Coupled Device) or CMOS (Complementary Metal Oxide Semiconductor) device. The device could be used to home in on a particular object or visual pattern of the vehicle's receptacle (e.g., an LED, a bar code).

Apparatus 210 comprises locomotion means (not visible in FIG. 2) for moving the apparatus. Such locomotion means may include wheels, tracks, ball bearing, jackscrews, servos, hydraulics and/or other motion technology now known or hereafter developed.

Automatic charging apparatus 210 comprises embedded processor 214 for executing instructions for operating sensor 212, operating the locomotion means, managing power transfer and/or controlling other action (e.g., operation of an operator guide). These other actions may include exchanging information with a vehicle being charged (e.g., for billing, electrical charging activity), transferring such information to a computer server or other computing/communication device, interacting with other external devices (e.g., triggers such as a garage door or garage door control, a weight sensor, a guide for a vehicle operator operator). Processor 214 may comprise a microprocessor or other controller component.

Manual controls 216 may be implemented to allow manual operation of the apparatus to place it in a position that will allow a charger to engage a vehicle receptacle. For example, when apparatus 210 is to be used to charge a moped, electrical cycle or other relatively light vehicle, if sensor 212 is not activated or the apparatus is not correctly positioned, controls 216 may be used to assist the coupling by causing the apparatus to move in all directions for which it is configured.

In addition to controls for moving the apparatus in one, two or three dimensions, manual controls 216 may include controls for rotating the apparatus, activating or deactivating a charger, activating or deactivating sensor 212 or some other component of the apparatus, summoning an attendant, inputting billing information or other data. For example, buttons 230a, 230b may be operated to cause chargers 220a, 220b, respectively to deploy or retract.

In alternative embodiments of the invention, one or more manual controls for operating the charging apparatus may be located at some distance from the apparatus. For example, a remote control may be linked to the apparatus (wirelessly or by wire) to enable manual movement, input billing information and/or control charging of a vehicle without being proximate to the apparatus.

An automatic charging apparatus such as apparatus 210 may also include components for conditioning and/or converting power (e.g., AC to DC, DC to AC) as necessary to facilitate operation of its chargers, or such action may take place before power is fed through apparatus 210 to the chargers. Although not shown in the Figures, apparatus 210 may be wired to a suitable power source (e.g., 110 volt or 220 volt AC power) in any convenient manner.

Yet further, apparatus 210 may include transceiver 218 for communicating with a vehicle, an operator guide (for guiding a vehicle operator into a position at which the apparatus can charge the vehicle), a computing device and/or other equipment. In some implementations, the transceiver may be coterminous with sensor 212 (e.g., if the apparatus uses RF wave to detect a vehicle's RFID tag and also to communicate with the vehicle), or may comprise any suitable transmission/reception devices now known or hereafter developed.

In FIG. 2, triggering means for initiating operation of automatic charging apparatus 210 comprises sensor 212 (and/or transceiver 218) and processor 214 for operating the sensor, interpreting its results and communicating instructions as necessary (e.g., to an operator guide positioned within or without the vehicle). Specifically, operation of the charging apparatus may be triggered by a determination that the vehicle (e.g., a vehicle receptacle or a target point of the vehicle such as an RFID chip) has come within range of the sensor.

In other embodiments of the invention, trigger means may also or instead comprise an external sensor that communicates with charging apparatus 210 to trigger it. As described above, an external sensor may be located within a vehicle and may sense placement of the vehicle into a "park" gear, detect that the vehicle has been turned off, sense opening of a seat belt or a car door, etc. Or, an external sensor may detect opening of a garage door, activation of a motion sensor, presence of a large mass, etc.

Although no specific locomotion means are visible for apparatus 210 in FIG. 2, such means may include wheels, tracks, rollers and/or other elements. Illustrative means by which a charging apparatus may automatically move are described in conjunction with other embodiments of the invention described herein.

Charging means of apparatus 210 comprises an appropriate charger 220 that is compatible with the vehicle, along with any other conditioning or distribution components that convey electrical power from outside of the apparatus to the charger. Charging means may also comprise processor 214 to the extent needed to regulate how much or how long power is supplied to the vehicle. Alternatively, a control device aboard the vehicle may sense when the vehicle's batteries are fully charged, and may request cessation or alteration of the power transmission.

It may be noted that an automatic charging apparatus may be engaged to charge a vehicle for any period of time. Thus, it may be charged anytime the vehicle is idle (e.g., at a traffic light, in a parking space, in line at a drive-through window, when parked at home), even if only for a few minutes.

In some embodiments of the invention, an automatic charging apparatus may have limited or no means of locomotion and/or rotation. The manner or extent to which the apparatus may move or rotate may drive the complexity of an operator guide. For example, if the apparatus can only raise and lower (and not move horizontally), the guide may require a vehicle operator to place the vehicle in a very specific position, and be configured to assist the operator accordingly.

For example, an automatic charging apparatus may be installed in a manner that requires a vehicle operator to stop his or her vehicle in a specific location (e.g., immediately over the apparatus). If the apparatus cannot be raised or lowered, the apparatus may be installed in such a manner that when a vehicle is situated correctly, a charger is coupled with the vehicle by the very act of placing the vehicle in the correct position.

In such an embodiment of the invention, contacts for a conductive charger may be exposed on the top of the apparatus, or windings for an inductive charger may be embedded in the top surface of the apparatus. As the vehicle is placed into the correct orientation, corresponding conductive contacts or inductive windings of the vehicle's receptacle are automatically engaged.

Figure 3A:
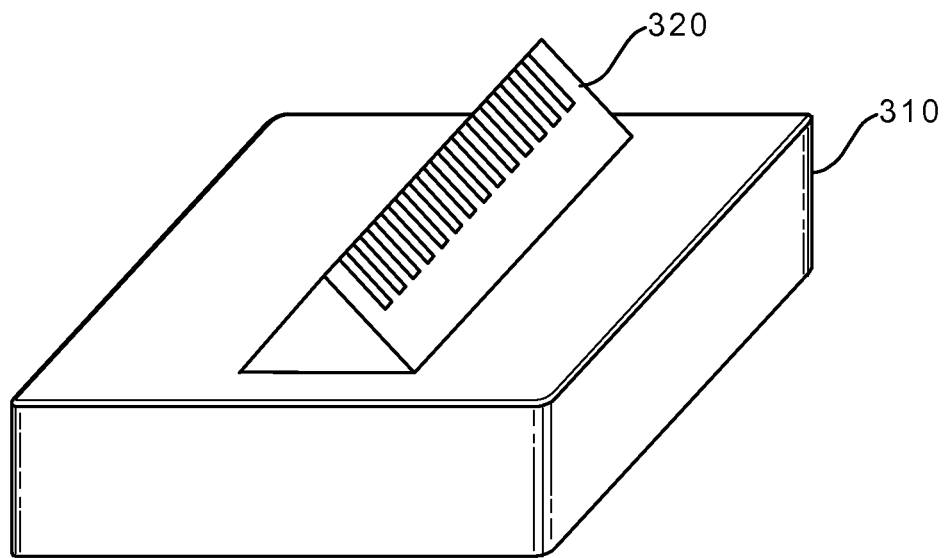
FIGS. 3A and 3B are block diagrams of conductive and inductive chargers that may be implemented with an automatic vehicle charging apparatus, according to some embodiments of the invention.
Figure 3B:
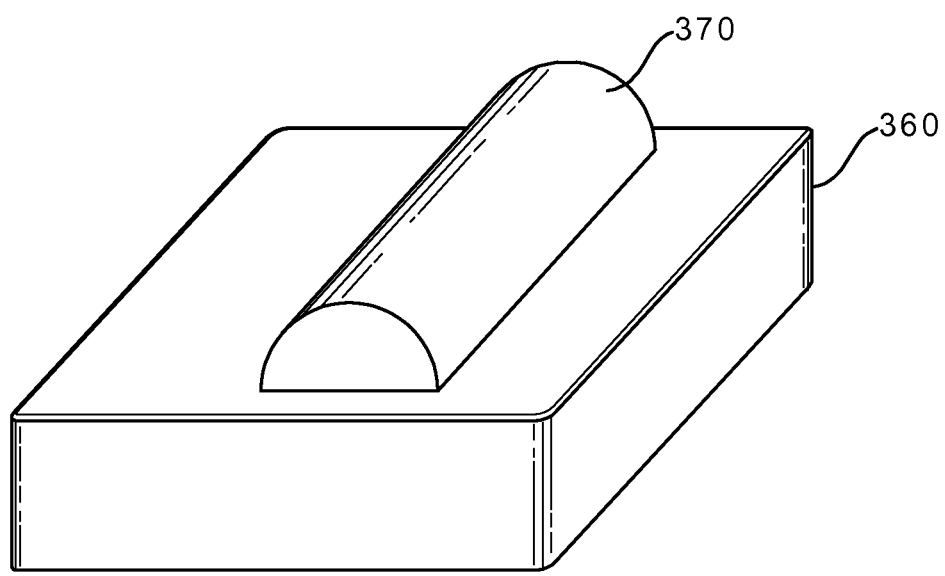

FIGS. 3A-B demonstrate embodiments of the invention in which an automatic charging apparatus is stationary or has only limited movement capability. In these embodiments, chargers are configured so that they automatically couple with a vehicle's charging receptacle when the vehicle is placed in a correct position.

Apparatus 310 comprises conductive charger 320, and apparatus 360 comprises charger 370. In other embodiments of the invention, multiple chargers may be implemented in a stationary automatic charging apparatus.

Apparatuses 310, 360 may be installed such that the surface of the apparatuses are flat, inclined, declined or otherwise slanted to facilitate coupling with a vehicle. Where such an apparatus is installed on the ground, the surface of the ground or the apparatus may be downward sloping in the direction a vehicle drives to reach the apparatus, so that as the vehicle's receptacle approaches the apparatus, the receptacle settles onto or against the charger. Also, or alternatively, charger 320 or 370 may "float" on a spring-based attachment to the apparatus, or the apparatus itself may be supported by spring means or other means that "give" as the vehicle comes to rest. Thus, as a vehicle receptacle contacts a charger, the charger and/or apparatus may give to some degree while the vehicle reaches its final charging position.

In some embodiments of the invention, safety and/or efficiency may be enhanced by only allowing full electrical current to flow to a charger (and via the charger to the vehicle) after it is engaged or after a vehicle is sensed in position for being charged. Limited current may be supplied at other times to enable detection of a vehicle (e.g., by sensing a load on a charger), or current may be totally disengaged when no vehicle is in place. As another alternative, slidable lids or hoods may cover the charging apparatus and/or a vehicle's receptacle, and be automatically retracted or moved into a non-obstructing position when the vehicle approaches the apparatus.

In some embodiments, an inductive charger of an automatic charging apparatus may comprise multiple windings or coils, and the winding that can transfer power most efficiently may be the one used to charge the vehicle. Determining which winding is in the best position may involve communication between the vehicle and the apparatus, or the apparatus may be able to sense which winding can provide the most efficient power transfer, based on the vehicle's position relative to the apparatus.

In some embodiments of the invention, an automatic charging apparatus comprises a wireless charger. In these embodiments, the apparatus comprises a transmitter or a first coil, and an electric vehicle comprises a receiver or second coil. Either or both devices may be rotated, panned or otherwise directionally adjusted to improve the targeting of the power transfer, which may be performed via induction, resonant induction or other means (e.g., laser, microwave).

If the power transmitter is adjustable, the charging apparatus need not be movable in order to charge a vehicle that can be charged wirelessly. Thus, the automatic charging apparatus may be located at some distance from where a vehicle is located, and still be able to charge it. The apparatus may communicate with the vehicle (e.g., via the same or a different transmitter) to assist the targeting and boost the efficiency of the transfer.

In these embodiments of the invention, because the apparatus and vehicles it charges can be separated by some distance, one apparatus may successively charge multiple vehicles without requiring them to be moved. For example, after one vehicle is fully charged (or charged to some threshold level), it may target a second vehicle and begin charging.

Figure 4:
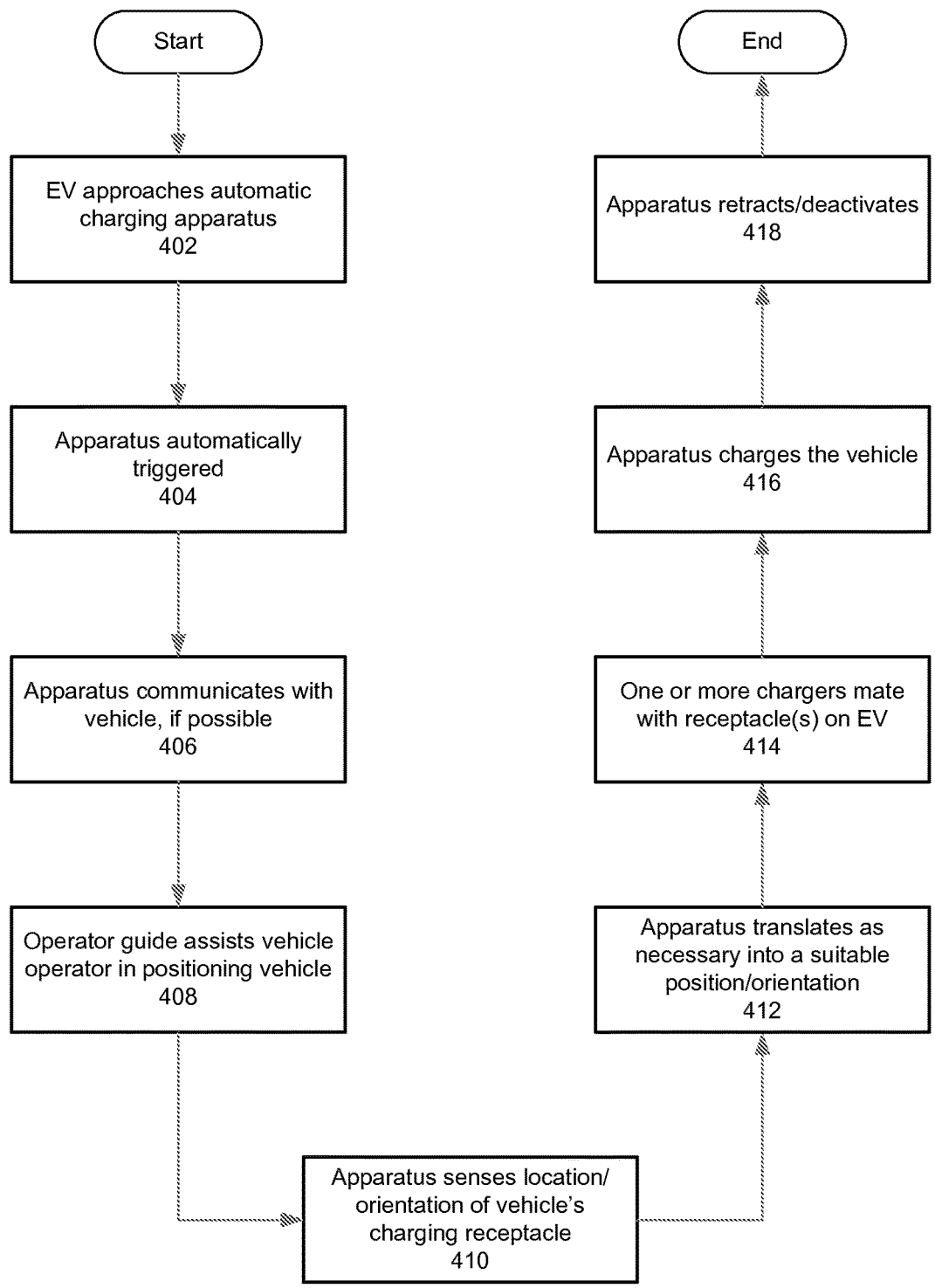
FIG. 4 is a flowchart illustrating one method of automatically charging an electrically powered vehicle in accordance with some embodiments of the invention.

FIG. 4 is a flowchart demonstrating a method of automatically charging an electrically powered vehicle, according to some embodiments of the invention.

In operation 402, an EV approaches an automatic charging apparatus. The apparatus may be installed in a private garage, a public parking lot, a commercial area or somewhere else, and may be installed horizontally (e.g., on the ground), vertically (e.g., on a post or wall) or in some other orientation.

In operation 404, the apparatus is triggered by detection of the vehicle by an on-board sensor or an external sensor configured to communicate with the apparatus. In the presently described embodiments, the sensor detects that the vehicle (or some mass) is within some limited distance of the apparatus (e.g., a few feet, a few meters).

In operation 406, the apparatus attempts to communicate with the vehicle via Bluetooth, wireless Ethernet or some other wireless communication protocol. Assuming a communication link is established, the apparatus may query the vehicle for billing data, specifications of its charging system (e.g., conductive vs. inductive, type of physical adapter), owner/operator data, etc. In some implementations, the communication may be as simple as reading an RFID tag on the vehicle to obtain necessary information (e.g., owner/operator data, account number or other billing data, license plate).

Illustratively, if no response is received from the EV, the apparatus may assume that the vehicle is not seeking a charge or is incompatible with the apparatus, and may therefore deactivate and take no further action for this vehicle. Alternatively, it may attempt to communicate via some other means, such as via a wired connection before, during or after a charger couples with the vehicle's charging receptacle. In some implementations, a conductive charger may provide the wired communication link between the apparatus and the vehicle.

In some embodiments, a communication link between the apparatus and the vehicle may also be used to help guide the vehicle to a proper position. Thus, information for use by an operator guide onboard the vehicle may be transmitted across the link. The apparatus may also (or instead) communicate with a guide positioned elsewhere, to allow it to guide the vehicle operator.

In some alternative embodiments of the invention, communication is not required between the apparatus and the vehicle. In these embodiments, the apparatus will charge the vehicle regardless of whether a communication link is established.

In operation 408, the operator of the vehicle follows signals provided by an operator guide to park or stop the vehicle in a suitable position for charging. The guide may be located within the vehicle (e.g., on the dashboard) or may be external to the vehicle.

In operation 410, the automatic charging apparatus senses a location of the vehicle's charging receptacle, possibly with the same sensor that detected the vehicle in operation 404.

In operation 412, the apparatus uses its sensor to guide it as it moves horizontally and/or vertically to align itself with the vehicle's charging receptacle. The apparatus may also rotate as needed if, for example, the vehicle is stopped at an angle to the apparatus.

In some alternative embodiments of the invention, instead of most or all of the apparatus moving and/or rotating, an individual charger may be configured to move/rotate as needed to mate with the vehicle's charging receptacle.

In operation 414, a charger on the surface of the apparatus mates with the charging receptacle. As part of the mating process, lids or covers over the charging receptacle and/or the charger may retract or be pushed aside.

In operation 416, the vehicle is charged. The charging may continue for the full duration of time the vehicle and apparatus are engaged, may cycle on and off after the vehicle is fully charged, or the apparatus may deactivate after the vehicle is fully charged.

In operation 418, the apparatus deactivates and retracts to its original position, either in response to a sensor input or automatically at the end of fully charging the vehicle. Or, the apparatus may automatically retract when it senses movement of the vehicle. After operation 418, the illustrated method of the invention ends.

In embodiments of the invention in which the apparatus is mounted on a wall, post or other vertical surface, operations 412 and 414 may occur simultaneously as the vehicle essentially impales its charging receptacle on the charger. For example, the charging receptacle may be installed on the front end of the vehicle, in which case as the vehicle continues slowly forward, the apparatus places the charger in position to couple with the receptacle.

Figure 5:
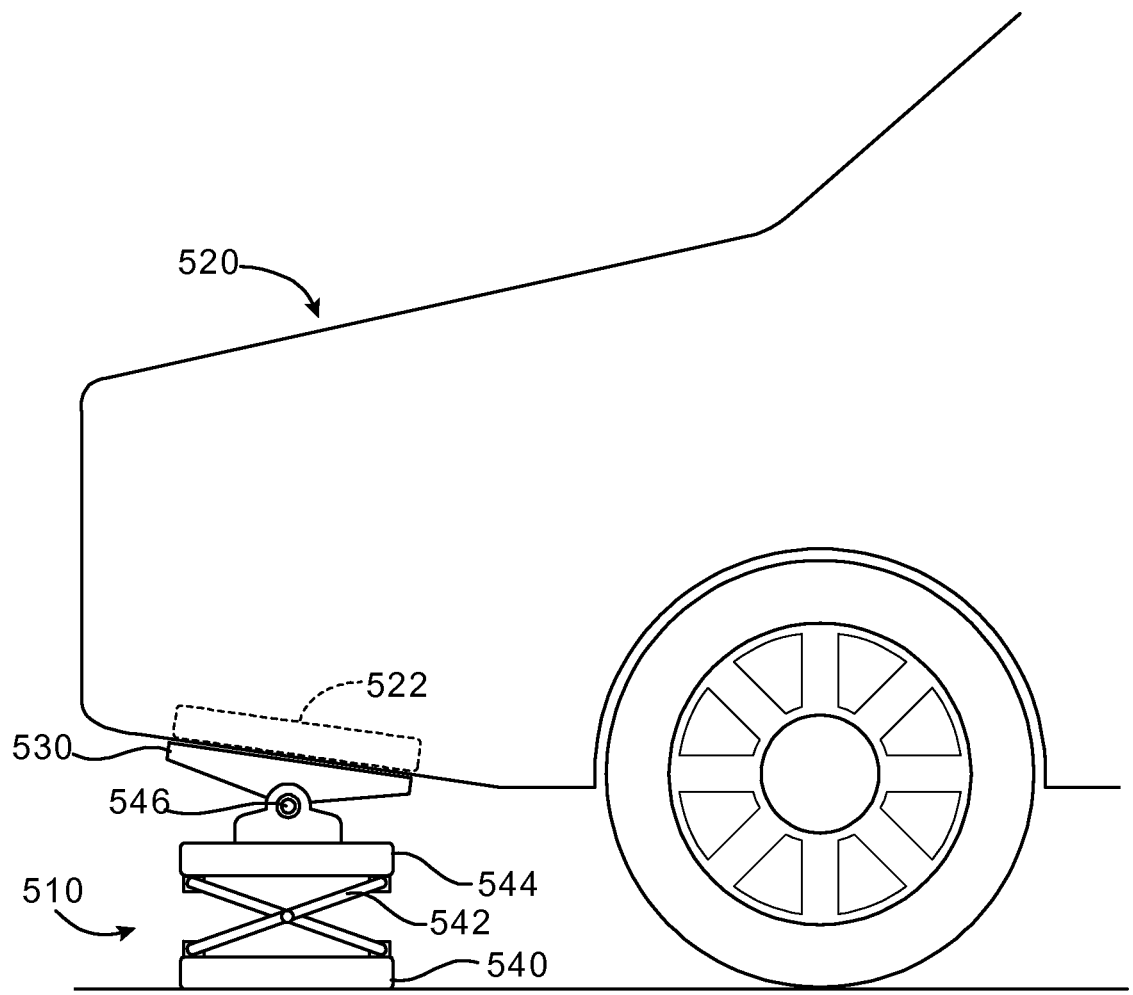
FIGS. 5-6 illustrate an automatic vehicle charging apparatus in accordance with some embodiments of the invention.
Figure 6:
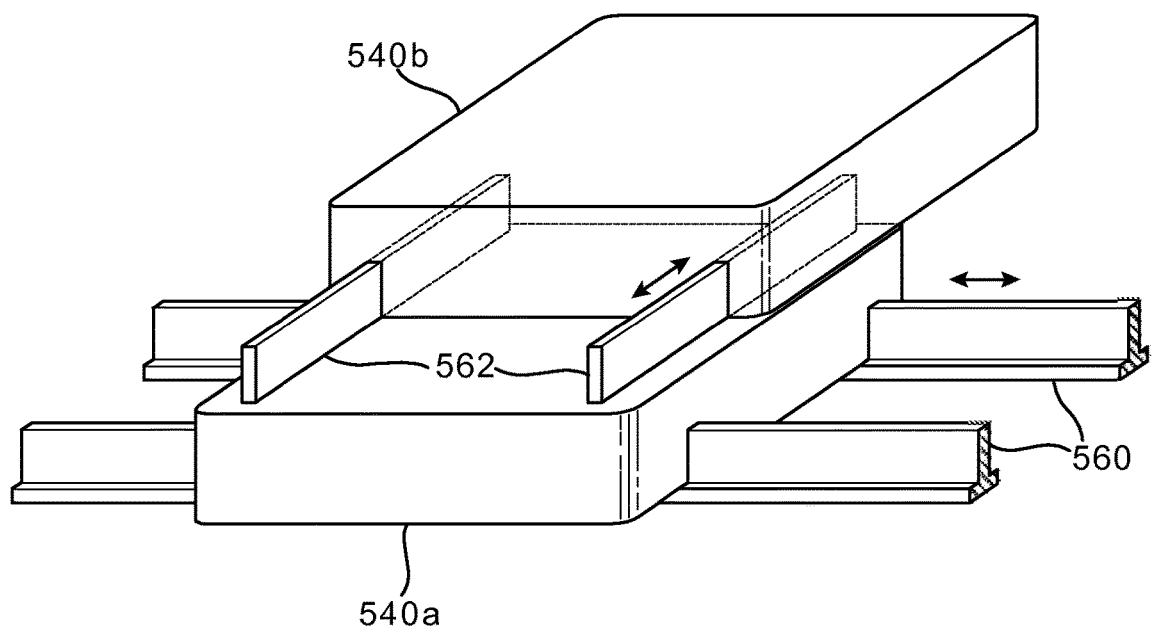

FIGS. 5-6 illustrate an automatic vehicle charging apparatus in accordance with some embodiments of the invention. In these embodiments, the apparatus is configured to move in three axes (e.g., left/right, forward/backward, up/down) and also includes means for rotating, panning or otherwise adjusting a charger to mate with a vehicle's electrical charging receptacle.

As shown in FIG. 5, movable automated charging apparatus 510 comprises base 540, scissor lift 542, pedestal 544, joint 546 and charger 530. Charger 530 may be any type of charger, and is configured to mate with vehicle receptacle 522 physically (e.g., for conductive or some forms of inductive charging) or via proximity (e.g., for near-field and some configurations of inductive charging).

As shown in FIG. 5, apparatus 510 may be installed such that when a vehicle is moved into position for charging, the apparatus is situated underneath a front (or rear) of the vehicle, forward of and between two wheels in the case of a vehicle that has two wheels in its front (or rear) end.

Scissor lift 542, which is affixed to base 540, operates to extend and retract charger 530, and in an illustrative implementation may comprise an electric stepper motor (or other type of motor) that drives a screw mechanism (e.g., a jack screw). When operated, the scissor extends/opens the scissor to lift charger 530 or retracts/closes the scissor to lower the charger.

Pedestal 544 is affixed to the top of scissor 542, and supports joint 546 and charger 530. In other embodiments of the invention, joint 546 or charger 530 may be directly coupled to the scissor lift.

Joint 546 may comprise a single-axis joint, in which case charger 530 can be rotated solely about that axis—so as to orient charger 530 to meet receptacle 522. Alternatively, joint 546 may comprise a multi-axis joint (e.g., a ball joint), in which case it may be able to tilt, pan, yaw, rotate and/or make other movements to align charger 530 with vehicle receptacle 522. As described elsewhere, charger 530 or some other element of apparatus 510 (e.g., pedestal 544) may comprise a sensor or guide to help align charger 530 and receptacle 522.

Other components of apparatus 510 not depicted in FIGS. 5 and 6 (e.g., processor, transceiver, manual controls) may be located in base 540, pedestal 544 or some other portion of the apparatus.

As shown in the overhead view of FIG. 6, base 540 comprises lower portion 540a and upper portion 540b and is able to move in two axes, along longitudinal tracks 560 and transverse tracks 562. Illustratively, longitudinal tracks 560 may be oriented substantially parallel to an axle of a vehicle using the apparatus, or parallel to an imaginary line connecting a vehicle's front (or rear) tires. Tracks 560 may thus be affixed to the ground or other surface on which apparatus 510 is installed.

Transverse tracks 562 are oriented substantially perpendicular to longitudinal tracks 560, and are affixed to lower portion 540a of apparatus 510. Thus, in these embodiments of the invention, lower portion 540a uses longitudinal tracks 560 (e.g., to move sideways on the ground), and upper portion 540b uses transverse tracks 562 (e.g., to move forward and backward on the lower portion of the base).

To move along tracks 560, 562, base portions 540a, 540b may include wheels powered by one or more servos or electric motors, slides that have low coefficients of friction for sliding along the tracks, or other means of engaging and traversing the tracks.

Tracks 560, 562 may be configured differently in other embodiments of the invention. For example, the tracks may comprise teeth or prongs, in which case base 540 may comprise motor-driven gears or toothed wheels that traverse the tracks. As another alternative, the base may comprise one or more servos or motors coupled to cables attached to the base for pulling the separate portions of the base along the tracks.

In yet other embodiments of the invention, an automated charging apparatus's means of locomotion may include a single or multi-jointed arm that hosts one or more chargers. In these embodiments, a base of the arm may be stationary (e.g., attached to the ground, a wall or other support), or may be capable of limited movement, but the arm can be extended, retracted, rotated and/or otherwise moved through one, two or three axes of motion to align a charger with a vehicle receptacle.

Figure 7:
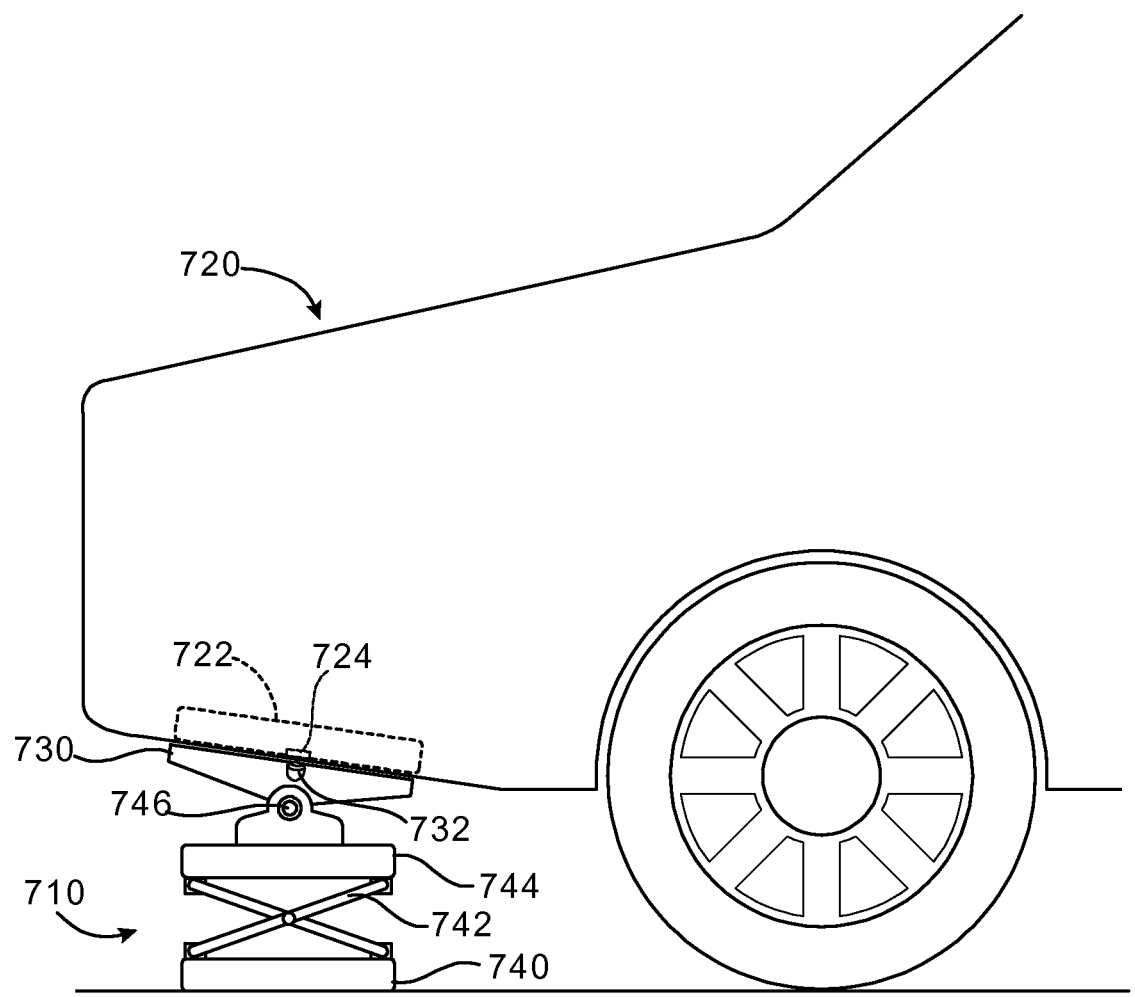
FIGS. 7-8 illustrate an automatic vehicle charging apparatus in accordance with some embodiments of the invention.
Figure 8:
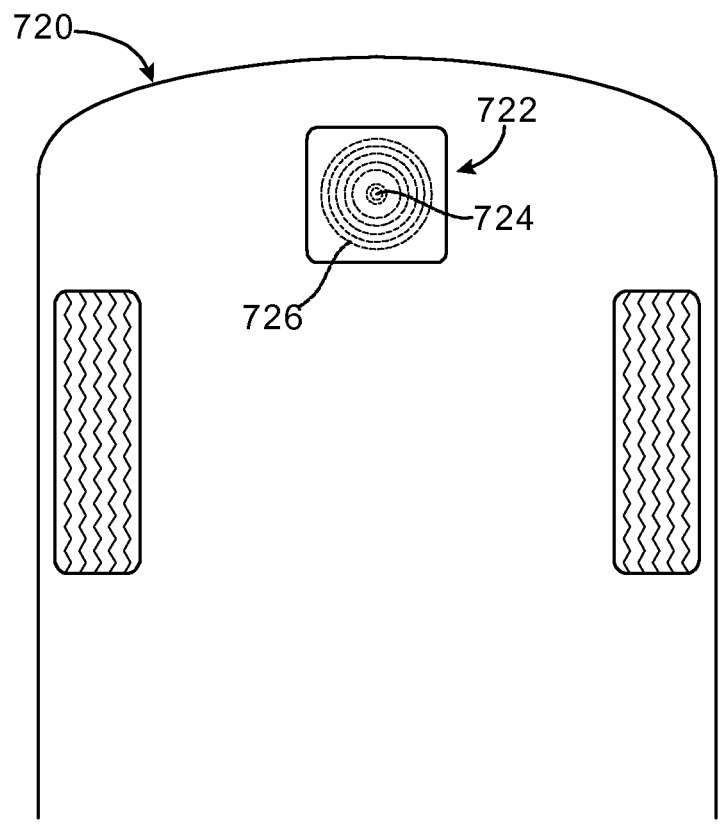

FIGS. 7-8 demonstrate an automated vehicle charging apparatus according to some embodiments of the invention. In these embodiments, the apparatus or a charger portion of the apparatus is guided to a vehicle receptacle by a component or configuration of the receptacle.

As shown in FIG. 7, apparatus 710 may be configured substantially similarly to apparatus 510 of FIG. 5, and therefore comprises base 740, lift 742, pedestal 744, joint 746 and charger 730. Base 740 may or may not be movable within the plane of the ground (or other surface on which it is installed), but lift 742 allows the apparatus to extend upward and retract downward.

Joint 746 may allow rotation or twisting in one or more axes to orient charger 730 as needed. In some implementations, charger 730 is an inductive charger and thus comprises one or more inductive coils for transferring electrical energy to compatible coil(s) 726 of receptacle 722 of vehicle 720. In other implementations, charger 730 may operate conductively, via near-field or some other power-transfer technology.

Vehicle receptacle 722 comprises LED (Light Emitting Diode) 724 or some other form of electromagnetic beacon. The beacon may operate within visual light frequencies, infra-red, RF frequencies, or some other frequency range. Apparatus 710 or charger 730 comprises sensor 732 for homing in on the beacon. Illustratively, sensor 732 may comprise a camera, CCD, CMOS sensor, or other detector.

In these embodiments of the invention, apparatus 710 may be triggered when sensor 732 detects the vehicle beacon, or may be triggered in some other manner described herein. As the vehicle approaches apparatus 710 (or after the vehicle has stopped), sensor 732 acquires beacon 724 and outputs signals (e.g., to an apparatus processor) that cause apparatus 710 and/or individual components (e.g., charger 730, joint 746, lift 742, base 740) to move as necessary to allow charger 730 to mate with receptacle 722.

For example, output from sensor 732 may be received by a processor within the apparatus, which instructs servos/motors to operate. The processor may also cause the apparatus to move in some default manner to help sensor 732 seek and acquire the vehicle beacon. Thus, the scissor lift may be extended to raise the sensor, joint 746 may be panned or rotated, and so on.

As shown in FIGS. 7 and 8, receptacle 722 and/or beacon 724 may be installed underneath vehicle 720. Illustratively, they are situated underneath an outer skin or protective coating applied to some or all of the vehicle. The coating may be transparent (e.g., clear plastic or polyurethane) if the beacon operates only within visual light ranges, and may have its own built-in sensor to detect whether the beacon is obstructed by dirt, ice or other foreign matter. If beacon 724 operates via non-visual frequencies, the protective coating may be opaque.

If sensor 732 cannot acquire a beacon when one is expected (e.g., after a weight sensor or other trigger means signals that a vehicle has arrived for charging), an error may be raised. The error may comprise an audible and/or visual alert that emanates from apparatus 710, an operator guide (e.g., such as guide 130 of FIG. 1), or some other equipment. The error may signify that the beacon (or sensor) is obstructed (e.g., by dirt, trash or other material), that the beacon is not within sensor range, that the beacon (or sensor) is not operating, etc.

In different embodiments of the invention, an automated vehicle charging apparatus may comprise different types of sensors. Visual sensors (e.g., cameras, CCDs, CMOS sensors) may capture images of a vehicle or vehicle receptacle, which may then be interpreted by a processor to determine how to move the apparatus (or a charger) to mate with the vehicle.

In some embodiments, a sensor may comprise a magnet to help with final positioning of a charger. For example, an inductive charger that merely needs to be placed adjacent to a vehicle receptacle may be guided to its proper orientation by the magnetic. Illustratively, as the charger moves toward the receptacle, the magnet snaps or locks onto a vehicle magnet of opposite polarity or a metallic guide specifically designed into the vehicle or receptacle for guiding the magnet. The magnet may be electrically powered; after the charger and receptacle have mated, it may be deactivated to allow the apparatus to withdraw from the vehicle.

In some other embodiments of the invention, an automated charging apparatus comprises an inductive charger that may be substantially flat or dish-shaped, and configured to engage a vehicle charging receptacle physically or via close proximity. If they engage via physical contact, either or both of the charger and vehicle receptacle may have one or more ridges, valleys, indentations or other contours to help the components mate correctly.

The environment in which a present embodiment of the invention is executed may incorporate a general-purpose computer or a special-purpose device such as a hand-held computer. Details of such devices (e.g., processor, memory, data storage, display) may be omitted for the sake of clarity.

The data structures and code described in this detailed description, or which may otherwise by implemented to operate an automated charging apparatus are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Automated methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. An apparatus for automatically charging an electrically powered vehicle, the apparatus comprising:
   a radio-frequency (RF) based sensor;
   a plurality of chargers, the plurality of chargers comprising a plurality of charger types, the plurality of charger types including at least two different means of transferring power and at least two different voltages; and
   a communication link between the vehicle and the apparatus, wherein the RF based sensor is configured to:
   detect the vehicle's proximity to the apparatus; and
   activate a guiding mechanism to assist an operator of the vehicle in positioning the vehicle to permit coupling of the apparatus and the electrically powered vehicle;
   wherein the plurality of chargers are configured to automatically mate with and supply electrical power to the electrically powered vehicle; and
   wherein information exchanged via the communication link includes:
   configuration information received and used by the apparatus to identify which of the two different means of transferring power and which of the at least two different voltages are required by the electrically powered vehicle and to select one of the plurality of charger types having the identified means of transferring power and the identified voltage to activate and to use to charge the electrically powered vehicle; and
   billing information for automatically billing for the charging of the electrically powered vehicle.

2. The apparatus of claim 1, further comprising:
   means for moving the apparatus in at least one axis of movement.

3. The apparatus of claim 1, further comprising:
   a processor configured to control operation of said sensor.

4. The apparatus of claim 1, further comprising:
   a transceiver configured to establish the communication link between the apparatus and a corresponding communication device associated with the vehicle.

5. The apparatus of claim 4, wherein data exchanged via the communication link comprises one or more of, in addition to the billing information:
   an identity of the vehicle;
   an identity of an owner of the vehicle; and
   information for aligning the vehicle and the apparatus for the charging.

6. The apparatus of claim 1, further comprising:
   a set of manual controls configured to facilitate manual operation of the apparatus.

7. The apparatus of claim 1, wherein said sensor senses the vehicle using radio-frequency waves.

8. The apparatus of claim 1, wherein said sensor senses the vehicle using light waves.

9. The apparatus of claim 1, wherein the one or more chargers include a conductive charger.

10. The apparatus of claim 1, wherein the one or more chargers include an inductive charger.

11. The apparatus of claim 1, wherein the one or more chargers include a wireless charger.

12. The apparatus of claim 1, wherein the apparatus is installed on private property.

13. The apparatus of claim 1, wherein the apparatus is installed on commercial property.

14. The apparatus of claim 1, wherein the apparatus is installed on public property.

15. A method of automatically charging an electrically powered vehicle, the method comprising:
   receiving at a radio-frequency (RF) based sensor of an automatic charging apparatus a first electronic signal signifying presence of the vehicle in proximity to the automatic charging apparatus, the automatic charging apparatus comprising a plurality of chargers, the plurality of chargers comprising a plurality of charger types, the plurality of charger types including at least two different means of transferring power and at least two different voltages;
   activating a guiding mechanism to assist an operator of the vehicle in positioning the vehicle to permit coupling of the automatic charging apparatus and the electrically powered vehicle;
   automatically establishing a communication link between the automatic charging apparatus and the electrically powered vehicle, wherein information transmitted to the automatic charging apparatus from the vehicle via the communication link includes:
   configuration information received and used by the apparatus to identify which of the two different means of transferring power and which of the at least two different voltages are required by the electrically powered vehicle and to select one of the plurality of charger types having the identified means of transferring power and the identified voltage to activate and to use to charge the electrically powered vehicle, wherein the plurality of chargers are configured to automatically mate with and supply electrical power to the electrically powered vehicle; and
   billing information for automatically billing for the charging of the vehicle;
   identifying which of the two different means of transferring power and which of the at least two different voltages are required by the electrically powered vehicle;
   selecting one of the plurality of charger types having the identified means of transferring power and the identified voltage to activate;
   automatically mating an interface of the selected charger with a corresponding receptacle of the electrically powered vehicle without action on the part of the operator of the vehicle;
   charging an electrical power storage device of the electrically powered vehicle via the selected charger interface; and
   automatically billing for the charging, based on the billing information.

16. The method of claim 15, further comprising:
   waiting a predetermined period of time after said receiving before said automatically mating.

17. The method of claim 15, further comprising:
   receiving a second electronic signal signifying likely operation of the vehicle; and
   automatically disconnecting the at least one charger interface from the corresponding receptacle.

18. The method of claim 15, wherein said receiving a first electronic signal comprises receiving a signal from a sensor configured to detect a state signifying that the vehicle is ceasing operation.

19. The method of claim 15, wherein the automatic charging apparatus maintains a fixed position.

20. The method of claim 15, wherein the automatic charging apparatus moves in its entirety to accomplish the coupling of the automatic charging apparatus and the vehicle.

* * * * *